United States Patent

Kauppi

[11] Patent Number: 5,832,381
[45] Date of Patent: Nov. 3, 1998

[54] LOCATION UPDATING IN A CELLULAR RADIO NETWORK

[75] Inventor: Hanna-Maria Kauppi, Espoo, Finland

[73] Assignee: Nokia Telecommunications Oy, Espoo, Finland

[21] Appl. No.: 632,400

[22] PCT Filed: Oct. 19, 1994

[86] PCT No.: PCT/FI94/00469

§ 371 Date: Jun. 6, 1996

§ 102(e) Date: Jun. 6, 1996

[87] PCT Pub. No.: WO95/11577

PCT Pub. Date: Apr. 27, 1995

[30] Foreign Application Priority Data

Oct. 20, 1993 [FI] Finland .................................. 934629

[51] Int. Cl.[6] .................................................. H04Q 7/00
[52] U.S. Cl. .................... 455/432; 455/435; 455/443; 455/444
[58] Field of Search ........................ 455/422, 432, 455/433, 434, 435, 436, 440, 441, 443, 444, 458, 100, 101, 103

[56] References Cited

U.S. PATENT DOCUMENTS 4,876,738  10/1989  Selby ........................................ 455/435
5,530,910  6/1996  Taketsugu ................................. 455/444

FOREIGN PATENT DOCUMENTS

| 0 505 106 | 9/1992 | European Pat. Off. . | |
|---|---|---|---|
| 0 589 278 | 3/1994 | European Pat. Off. . | |
| 40373625 | 3/1991 | Japan | 455/100 |
| 468 696 | 3/1993 | Sweden . | |
| 2 242 806 | 10/1991 | United Kingdom . | |

*Primary Examiner*—Thanh Cong Le
*Attorney, Agent, or Firm*—IP Group of Pillsbury Madison & Sutro LLP

[57] ABSTRACT

A cellular radio network, subscriber equipment for the cellular radio network, and a method for carrying out a location updating in the cellular radio network, in which in the cellular radio network, or at least in part of it, several coincident logical location area levels (e.g. I, II, III) are provided, these levels being hierarchical with respect to location area size (e.g. LA1(L1), LA1(L2), LA2(L2), LA1(L3), LA2(L3), LA3(L3)). Location area density is thus different at different location area levels: large location areas are used at some location area levels, whereas small location areas are in use at others, correspondingly. Users/terminal equipments may either have a relatively fixed allocation to certain location area levels, or the terminal equipment may dynamically select the location area level appropriate at a given moment. For instance, stationary or low-mobility users may use dense location area levels (small location areas), and fast-moving users may use less dense location area levels (large location areas).

12 Claims, 2 Drawing Sheets

LOCATION UPDATING IN A CELLULAR RADIO NETWORK

This application claims benefit of international application PCT/FI94/00469 filed Oct. 19,1994.

BACKGROUND OF THE INVENTION

The present invention relates to a cellular radio network wherein each cell broadcasts one or more location area identifiers or identifiers adapted to be used as such, and which comprises mobile subscriber equipment capable of moving so that the location data of the mobile subscriber equipment is stored with an accuracy of a location area consisting of one or more cells in the cellular radio network. The invention also relates to subscriber equipment to be used in this type of cellular radio network and to a method for carrying out a location updating of the subscriber equipment in the network.

In a cellular radio network, base stations constantly broadcast information on themselves and on their neighborhood. This kind of information can include, for instance, a location area identifier, base station identifier, base station type identifier and so-called neighboring cell information. While being registered in a base station of a cell, a mobile radio station also monitors the quality of the transmission from the base stations indicated in the neighboring cell information broadcast from said base station, and switches to one of these base stations if the signal strength of the current base station weakens. The cellular radio network usually knows the location of a mobile radio station with an accuracy of a so-called location area, which includes a suitable number of predetermined cells with their respective base stations. The location area information broadcast from the base station indicates to the mobile radio station which location area the cell belongs to. When the mobile radio station changes cell within the same location area, no location updating to the cellular radio network is required. Instead, when the mobile radio station observes that the location area changes as it switches to a new base station, it initiates a location updating by transmitting a location updating request to the cellular radio network. As a result of this location updating request, the cellular radio network stores the new location of the mobile radio station in subscriber location registers.

If the location of a mobile radio station is known with an accuracy of a location area only, it is necessary to page the mobile station via all the cells within the location area in order to set up a mobile-terminating call. This causes considerable signalling load, especially on the radio path but also in the radio network between the exchange and the base stations. The amount of signalling due to subscriber paging is thus in direct proportion to the size of location areas. On the other hand, reducing the size of a location area in order to avoid the above-mentioned disadvantage will lead to a situation where a mobile station changes location area more often, whereby the rate of location updating and the signalling relating to it increase. Efforts are made today to increase the size of location areas in order to reduce location updating.

The mobility behavior of individual users in a cellular radio network can vary very much. Some users frequently move across the typical location area boundaries while others normally stay within a very small part of whatever one is their current location area. Thus, instead of using the same location areas for all subscribers, it would be possible to optimize subscriber pagings and to better distribute the signalling relating to location updatings to different parts of the cellular network if location areas of different sizes were applied with regard to different users.

SUMMARY OF THE INVENTION

The object of the invention is to enable a flexible use of location areas of different sizes with regard to different users in a cellular radio network.

This is achieved with a cellular radio network wherein each cell broadcasts one or more location area identifiers or identifiers adapted to be used as such, and which comprises mobile subscriber equipment capable of moving so that the location data of the mobile subscriber equipment is stored with an accuracy of a location area consisting of one or more cells in the cellular radio network. The radio network according to the invention is characterized in that at least part of the cellular radio network comprises at least two hierarchically arranged logical location area levels with location areas, the sizes of the respective location areas being different at different location area levels.

Another aspect of the invention is subscriber equipment for a cellular radio network, in which cellular radio network each cell broadcasts one or more location area identifiers or identifiers adapted to be used as such, and which comprises mobile subscriber equipment capable of moving so that the location data of the mobile subscriber equipment is stored with an accuracy of a location area consisting of one or more cells in the cellular radio network. According to the invention, the subscriber equipment is characterized in that it comprises means for receiving location area information from a cell, this location area information including the location area identifiers of those location areas of at least two hierarchically arranged location area levels which the cell belongs to; means for selecting the location area level, and means for carrying out a location updating when the subscriber equipment moves from one location area into another at the selected location area level.

Yet another aspect of the invention is a method for carrying out a location updating in a cellular radio system, comprising the steps of:
  storing the location data of a mobile subscriber equipment with an accuracy of a location area consisting of one or more cells,
  broadcasting within each cell one or more location area identifiers or identifiers adapted to be used as such, and
  carrying out a location updating by updating said location data of the subscriber equipment at least when the subscriber equipment moves into a cell which broadcasts a location area identifier not belonging to the location area determined by the location data currently stored in the subscriber equipment.

The method according to the invention is characterized in:
  using at least two hierarchically arranged location area levels with location areas of different sizes with each other, in at least part of the cellular network,
  transmitting to the mobile subscriber equipment the identifiers of those location areas of all the location area levels which the current cell of the subscriber equipment belongs to,
  selecting a location area level for the mobile subscriber equipment, and
  carrying out the location updating of the mobile station when the subscriber equipment moves from a location area into another at the selected location area level.

The basic idea of the invention is that several coincident logical location area levels, that are hierarchical with respect to location area size, are used in the cellular radio network, or at least in part of it. Location area density is thus different at different location area levels; in other words, large location areas are used at some location area levels whereas small location areas are in use at others, correspondingly. Users/terminal equipments may either have a relatively fixed allocation to certain location area levels, or the terminal equipment may dynamically select the location area level appropriate at a given moment. As regards mobile-terminating calls, subscriber paging can be directed within an area of a suitable size, because the location of the terminal equipment is updated for the most accurate possible location area level applicable to a mobile station. For instance, stationary or low-mobility subscriber stations may use dense location area levels (small location areas), and fast-moving subscriber stations may use larger location area levels (large location areas). Since the invention offers the possibility of applying location areas of different sizes to different users/subscriber stations, and the location area boundaries of different location area levels are distributed in different ways, the amount of signalling in the cellular radio network radio due to simultaneous location updatings can be equalized, because location updatings are not carried out for all subscriber stations in the area of the same base stations. This is a significant property as the invention is compared to location updating in the present-day cellular networks, in which the entire network is divided into location areas existing at a single level. In this case, the location updating is carried out for all network users at the same location area boundaries, which causes significant signalling load. In some cases, it may be preferable to apply the several location area levels according to the invention only in part of the network, for instance in busy areas with a lot of signalling, and to apply one location area level in a conventional manner in the rest of the network.

BRIEF DESCRIPTION OF THE DRAWINGS

The invention will be described by means of illustrating embodiments with reference to the accompanying drawings, in which.

DETAILED DESCRIPTION

The present invention can be applied in connection with any cellular radio system, such as the digital GSM mobile phone system, NMT (Nordic Mobile Telephone), DCS1800, PCN (Personal Communication Network), UMC (Universal Mobile Communication), UMTS (Universal Mobile Telecommunication System), FPLMTS (Fututre Public Land Mobile Telecommunication System), etc.

Figure 1:
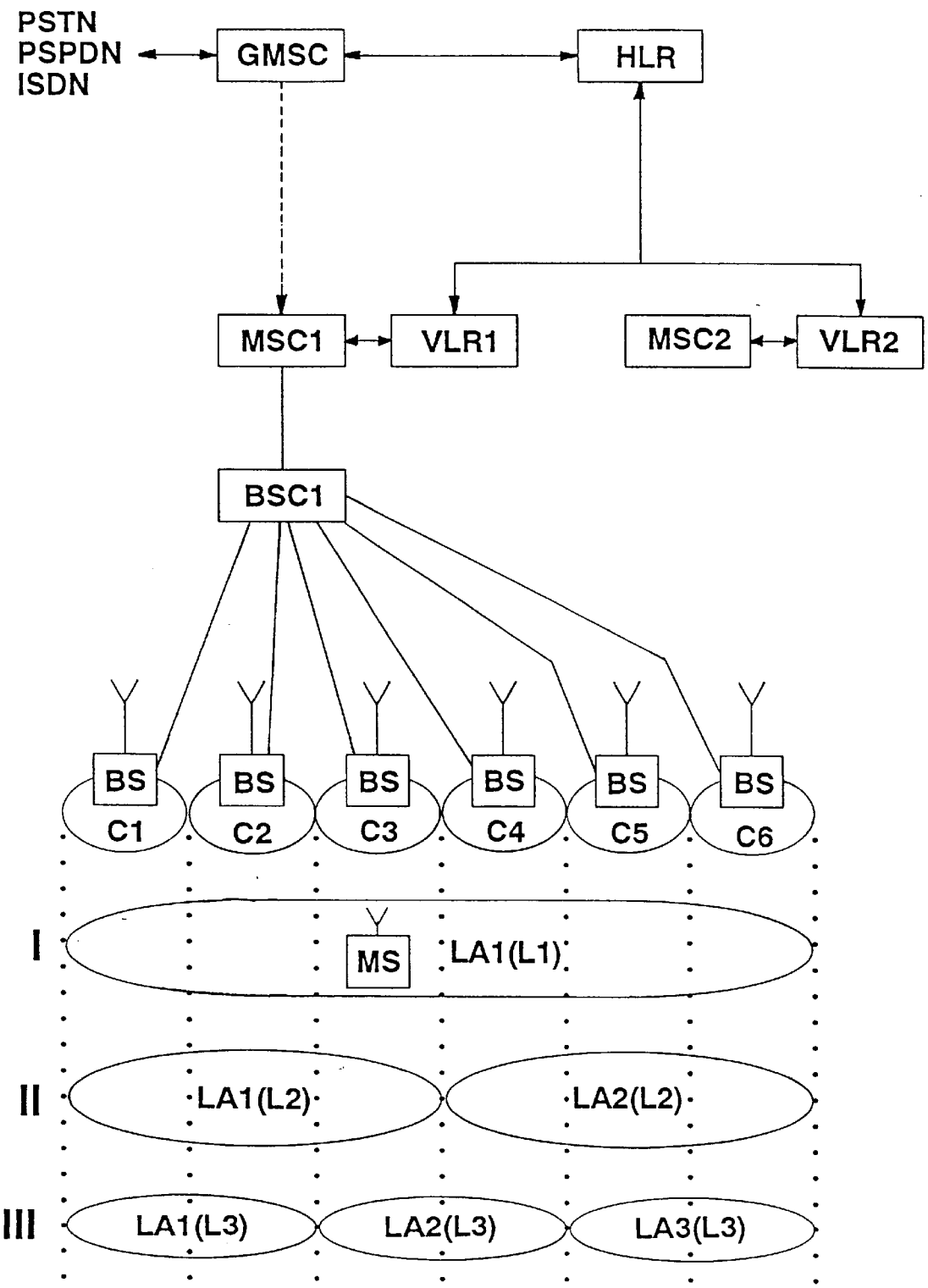
FIG. 1 illustrates a cellular radio network according to the invention.

As is well known, the geographical area covered by the network in cellular radio networks is divided into smaller separate radio areas, i.e. cells, in such a manner that while in cell C, a mobile radio station MS communicates with the network via a fixed radio station located in the cell, i.e. a base station BS, as illustrated in FIG. 1. Mobile radio stations MS included in the system can freely move within the system area from a cell to another. The cellular radio network must, however, know the location of the mobile radio station MS in order to be able to route mobile-terminating calls to the MS or to page it for some other reason. Typically, the cellular radio network knows the location of the MS with an accuracy of an area consisting of one or more cells, this area being generally called a location area.

The base stations of the cellular network constantly broadcast information on themselves or their neighborhood, such as location area identifier LAI, base station identifier BSI, base station type identifier BSTI and so-called neighboring cell information. On the basis of neighboring cell information broadcast by a respective base station BS, the MS registered in a cell served by that base station recognizes those neighboring cells the base-station transmission of which the MS should monitor. When the signal strength of the current base station BS weakens, the MS registers into the best of these monitored neighboring base stations (e.g. the one for which, from the viewpoint of the MS, the signal strength is then currently the strongest). The location area identifier of each base station which is in communication with an MS indicates to the MS which location area the base station BS belongs to. If the MS observes that the location area identifier LAI changes as the base station BS is changed, i.e. that the location area changes, the MS initiates a location updating by transmitting a location updating request to the cellular radio network. If the location area does not change when the base station changes, no location updating is carried out by the MS.

The location updating initiates subscriber data updating of the respective subscriber, in the subscriber location register (s) of the cellular network. For instance, in the GSM system, the cellular radio network comprises at least a home location register HLR, visitor location registers VLR, mobile exchanges MSC and base station controllers BSC, which are connected to the base stations BS of the network, as illustrated in FIG. 1. The location area data of the subscriber is stored in the visitor location register VLR, of which there are typically one for each mobile exchange MSC, whereas the HLR knows the VLR within the area of which the subscriber is located. The structure and operation of the GSM system are further described in GSM specifications and in "The GSM system for Mobile Communications", M. Mouly & M-B. Pautet, Palaiseau, France, ISBN: 2-9507190-0-7.

In the cellular radio system shown as an example in FIG. 1, each service area has its own visitor location register VLR, which is connected to the mobile exchange MSC of the service area concerned. FIG. 1 illustrates two service areas, one of which comprises a mobile exchange MSC1 and a visitor location register VLR1 and the other of which comprises a mobile exchange MSC2 and a visitor location register VLR2. Under both exchanges MSC, one or more base station controllers BSC are provided, controlling several base stations BS. In FIG. 1, the MSC1 controls the base station controller BSC1, which in turn controls the base stations BS of cells C1, C2, C3, C4, C5 and C6. Each base station BS communicates by means of a bidirectional radio link with the mobile stations MS in the corresponding cell. For clarity's sake, FIG. 1 shows only one mobile station MS, located in the cell C3.

In present-day cellular radio networks, the entire network is divided into location areas LA existing at the same level, i.e. each cell is fixedly allocated to only one location area. This will cause many problems related to location updating and subscriber paging, which have been referred to earlier in this specification.

According to the present invention, the cellular radio network is divided into a plurality of coincident location area levels, which are hierarchical with respect to location area size. FIG. 1 illustrates three location area levels I, II and III, but the number of location area levels can vary if need be. Each of the cells C1, C2, C3, C4, C5 and C6 belongs to one location area at each location area level I, II and III. In the example of FIG. 1, all six cells C1–C6 constitute one location area LA1 (L1) of level L1. At the location area level II, the location area structure is denser and the location area size smaller in such a manner that the cells C1, C2 and C3 constitute a location area LA1 (L2), and the cells C4, C5 and C6 constitute another location area LA2 (L2). Correspondingly, at the location area level III the location area structure is even denser and the location area size smaller in such a manner that the cells C1 and C2 constitute a location area LA1 (LA3), the cells C3 and C4 constitute another location area LA2 (L3), and the cells C5 and C6 constitute a third location area LA3 (L3). In the example, the location area configuration becomes thus more accurate in switching from the location area level I to the level II and further to the level III. The location area levels are thus hierarchical with respect to location area size. It is preferable to assume that the location area level I be a so-called primary level with the largest possible location areas. The primary level is preferably, for instance, the location area configuration used in present-day networks, and the location area configuration becomes denser in switching to lower levels. This is a recommendable solution, because the operation according to the invention is thus independent of the number of location area levels.

With reference to FIG. 1, the cell C3, for instance, belongs simultaneously to the location area LA1 (L1) at the level I, to the location area LA1 (L2) at the level II, and to the location area LA2 (L3) at the level III. The base station of the cell C3 thus simultaneously broadcasts the location area identifiers LA1 (L1), LA1 (L2) and LA2 (L3) related to all the levels I, II and III. The mobile station MS located in the cell C3 receives constantly location area information on all the logical location area levels I II and III and is thus aware of the boundaries of the different location areas.

The mobile station MS may have a fixed or a relatively fixed allocation to a certain location area level. Alternatively, the mobile station MS may dynamically select the location area level appropriate at a given moment.

In the first case, i.e. where fixed allocation is used, different mobile stations MS or user groups may at a given moment be allocated to use different logical location area levels. Allocation to a certain location area level may be completely fixed or based on default values. For instance, typical users in city center areas could be allocated on a default-value basis to use the most accurate location area level III, because they concentrate the use of services most likely to a relatively small area. There is, however, the disadvantage that especially the use of a fixed location area does not offer particularly extensive flexibility.

The alternative where the mobile station MS may dynamically select the level appropriate at a given moment is more flexible, because it allows the mobility behavior of the mobile station MS or the user to be taken into account, thus making it possible to gain advantage by changing the logical location area level used when the need arises.

In the following, the operation of the cellular radio network according to the invention will be described in more detail, assuming that the MS may dynamically select a certain location area level, and with reference to the example in FIG. 1. Each base station BS broadcasts, for instance, base station area identifier BSAI and the location area identifiers of all the location area levels. The location area identifiers of the different location area levels are always broadcast in a predetermined order. In the example of FIG. 1, the base stations BS broadcast the location area identifiers as follows:

Cell C1: LA1 (L1), LA1 (L2), LA1 (L3)
Cell C2: LA1 (L1), LA1 (L2), LA1 (L3)
Cell C3: LA1 (L1), LA1 (L2), LA2 (L3)
Cell C4: LA1 (L1), LA2 (L2), LA2 (L3)
Cell C5: LA1 (L1), LA2 (L2), LA3 (L3)
Cell C6: LA1 (L1), LA2 (L2), LA3 (L3)

The mobile station MS receives simultaneously and constantly information broadcast by several base stations BS while moving in the cellular network. Using certain criteria, such as signal level, the mobile station MS decides through which base station it can best communicate with the network. A location updating may also be possible when the base station area changes, if there is a location area boundary which is located exactly between two respective cells. In connection with the location updating, the mobile station MS stores the new location area identifier in order to be constantly able to compare location area data while moving from a cell to another and to observe when the location area changes. When observing on the basis of the stored location area data and the location area information broadcast by the base station BS that the location area changes, the MS transmits a location updating request to the network. In traditional cellular networks, only one location area level has been used, and the location updating has been carried out every time the location area has been observed to change. In the network according to the present invention, it is possible to carry out a location updating in two dimensions. The normal location updating can be carried out when moving from one location area to another at a same location area level, as in traditional networks. For instance, in the case of FIG. 1, the MS, which is in the location area LA1 (L2) at the location area level II, may carry out a location updating at the same location area level to the location area LA2 (L2) when moving from the cell C3 to the cell C4.

On the other hand, since several location area levels are used, it is also possible to carry out a location updating coincident with a transition from one location area level to another, on certain conditions. This kind of location updating between location area levels can be carried out when certain conditions are met, even if the location area boundary is not at the point where the subscriber station MS changes from one cell to another cell. The MS can, however, be registered to only one location area level at a time.

The ultimate purpose of the above-mentioned conditions is always to apply a location area level of an appropriate density to each user or mobile station MS. One object of carrying out a location updating to a more "accurate" location area level is always to minimize the subscriber paging signalling required in connection with subscriber-terminating calls. One of the most important criteria for carrying out a location updating from a location area level to another is the degree of mobility of the user or the mobile station in the network. If the user's degree of mobility is low, i.e., the user's location area seldom changes, or the user stays temporarily, yet for a significant period of time, in one place in the network, it is advantageous for the user to switch to the most accurate possible location area level. On the other hand, switching to a more accurate location area level will not necessarily be of advantage to the user or the mobile station with a high degree of mobility, i.e. one which moves a lot in the network, because the resultant increased number of location updatings thus loads the fixed network.

For the mobile station MS to be able to change location area levels appropriately, the MS of the preferred embodiment of the invention is equipped with a timer, on the basis of which the mobile station MS can determine the time it spends in a certain cell or in certain location area. The following will be a description of the location updating method of the preferred embodiment of the invention, when the mobile station MS uses this kind of timer function. Assume that the mobile station MS is located in the cell C3 of the location area LA1 (L1) at the location area level I in FIG. 1. The current location area information on the MS is thus LA1 (L1), which is updated in the databases of the cellular network, typically in the VLR, and which is stored in the actual mobile station MS. The MS receives from the base station BS of the cell C3 the location area identifiers of all the location area levels that the cell C3 belongs to, i.e. the identifiers LA1 (L1), LA1 (L2), LA2 (L3), and the information on the neighboring cells such as C2 and C4. When the MS moves into the area of the cell C4, the MS receives the location area information broadcast by the base station BS of the cell C4, which includes the location area identifiers of all the location area levels that the cell C4 belongs to, i.e. the identifiers LA1 (L1), LA2 (L2) and LA2 (L3). The MS observes that when it remains at the current location area level I, the location area is unchanged, the identifier being LA1 (L1), and no location updating is required. The MS does not thus initiate location updating to the cellular network but instead starts its own internal timer. The timer can thus be started when changing either the cell or the location area. By means of the information broadcast by the base stations BS, such as the base station area identifier, the MS observes if it is located in the area of the same base station BS. If the MS observes that it has moved into the area of another base station or into a new location area, the timer is set to zero and restarted. If the MS stays in the area of the same base station BS for a certain time, the internal timer of the MS reaches a predetermined threshold value, which means that it would be advantageous for the MS to switch to the more accurate location area level II. Because of this, as a result of the internal timer reaching the above-mentioned threshold value, the MS transmits a location updating request to the cellular network in order to carry out a location updating to the location area LA1 (L2) at the location area level II. The "new" location of the MS is thus updated in the database, the VLR for instance, of the cellular network, by a normal location updating. In other words, the new location area data stored in the network database and the terminal equipment is LA1 (L2). In the preferred embodiment of the invention, the MS is allowed to switch only to the next location area level at a time, either to a higher one or to a lower one, depending on the situation. In the preferred embodiment of the invention, the mobile station MS also comprises a counter, which counts the number of the changes of cells, location areas and location area levels performed by the MS during a certain period. The MS also comprises another internal timer for determining the measuring period. This other timer and the counter are set to zero every time a measuring period ends. During a measuring period or at the end of it, the MS compares the reading on the counter indicating the number of cell location area and location area level changes with one or more predetermined threshold values. In the example of FIG. 1, a single threshold value is preferably used at the location area level I. If the reading in the counter is higher than this threshold value at the end of the measuring period, the MS decides not to change the location area level. If the reading in the counter falls below this threshold value during the measuring period, the MS may decide to activate the location updating to the more accurate location area level II, if this is not prevented by some other condition. Correspondingly, two threshold values can be used at the location area level II in FIG. 1. If the reading in the counter is between these two threshold values during the measuring period, the MS decides not to change the location area level. If the reading in the counter is below the lower threshold value at the end of the measuring period, the MS may decide to carry out location updating to the more accurate location area level III. Further, if the reading in the counter exceeds the higher threshold value at the end of the measuring period, the MS may activate the location updating back to the more inaccurate location area level I. At the location area level III in FIG. 1, the mobile station MS decides to stay at the current location area level if the reading in the counter at the end of the measuring period is lower than the predetermined threshold value, and decides to switch to a higher location area level II if the reading in the counter at the end of the measuring period exceeds this predetermined threshold value.

In the location area level selection mechanism described above, the decision-making of the MS is thus based on its current mobility and on how much signalling relating to location updating is caused by staying at each location area level. The mechanism thus aims at optimizing the accuracy of the chosen location area level and the signalling load caused by the selection.

Unnecessary signalling load can be further diminished in such a manner that when the mobile station MS observes that there is a location area boundary at the next location area level, be it either higher or lower one, and when the conditions related to the change of the level are met, the MS may still try to stay at the current location area level in order to optimize location updatings if there is no location area boundary in the same area at the current location area level. In other words, one does not want to cause any unnecessary signalling by changing the location area level. This principle is particularly advantageous upon transition from a more accurate location area level to a less accurate one. It is thus possible to retain the smaller amount of signalling provided by the more accurate location area level for some time in the case of a potential mobile-terminating call.

The selection of the currently used location area level can also be based solely on the staying period in the cell or location area described first above, or solely on the number of cell, location area or location area level changes described second above. Instead of these, or in addition to them, other selection criteria for the location area can also be used without deviating, however, from the basic idea of the invention.

In the subscriber databases of the network, such as the visitor location register VLR of the GSM system, the location data on the user or the mobile station MS includes both the current location area level and the location area identifier at this location area level. When the location is determined in the hierarchical manner according to the invention, subscriber paging can be directed at areas of different sizes, depending on which location area level the MS has updated its location to. For instance, in the case of FIG. 1, in which the MS is located in the cell C3, the subscriber paging is directed within the area covered by the six cells C1–C6 if the MS has updated its location at the location area level I; within the area covered by the three cells C1–C3 if the MS has updated its location at the location area level II; and within the area covered by the two cells C3–C4 if the MS has updated its location at the location area level III. Accordingly, when the most accurate location area level III is used, the subscriber paging requires signalling by only two base stations in the cellular radio network and on the radio path, whereas a triple amount of signalling is required at the location area level I. On the basis of the hierarchical location data received from the subscriber database, the mobile exchange MSC selects the base stations through which the paging is to be performed in each particular case.

Figure 2:
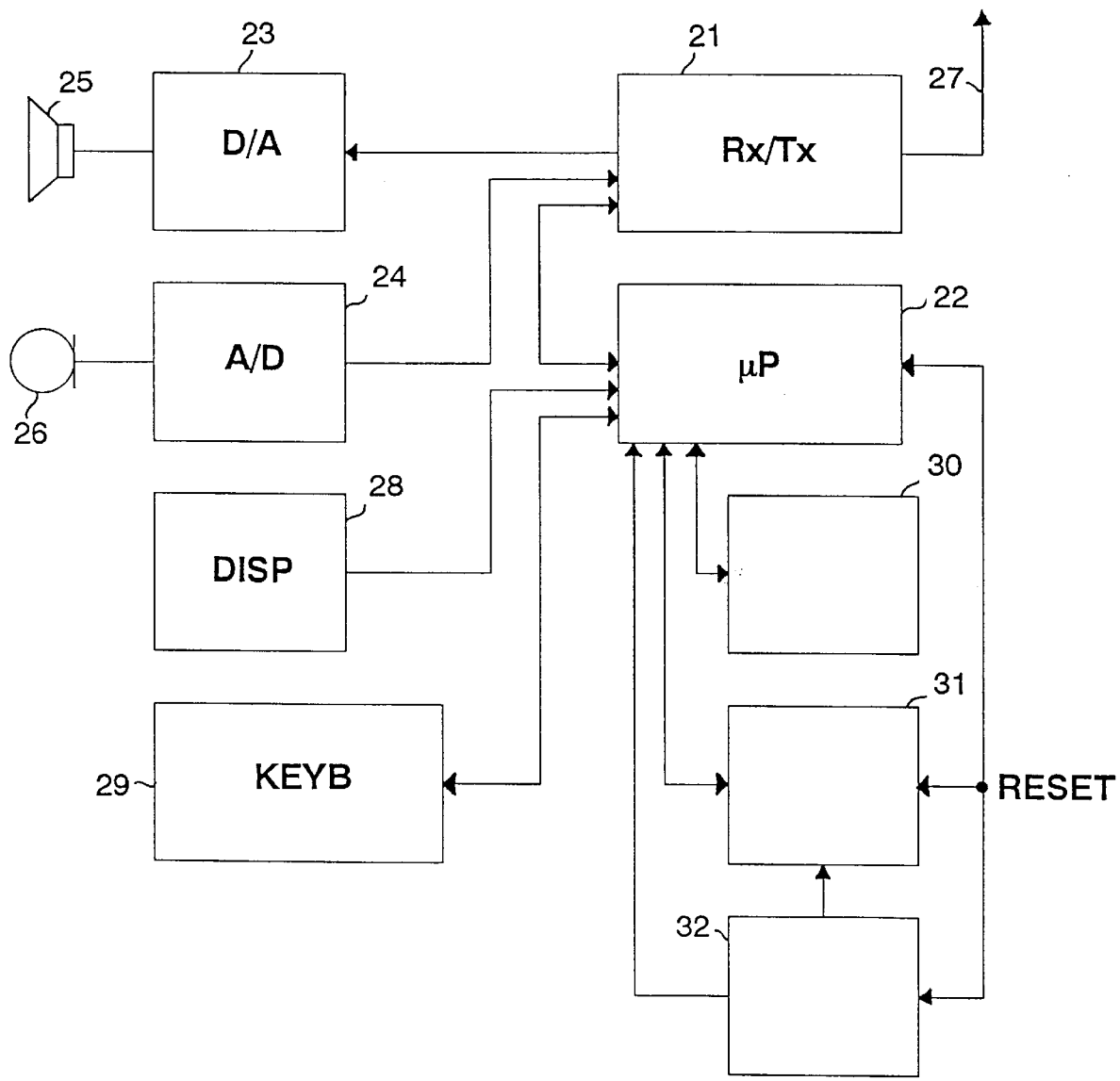
FIG. 2 is a general block diagram of subscriber equipment according to the invention.

In the mobile station MS, the function according to the invention can be embodied even in the currently available terminal equipment with relatively small modifications in the software. FIG. 2 shows a schematic block diagram of a mobile station MS in which the invention can be applied. The MS comprises a receiver-transmitter 21 connected to an antenna 27, the receiver being connected through a digital-to-analog and baseband circuit 23 to a loudspeaker 25, and the transmitter being connected through an analog-to-digital converter and baseband circuit 24 to a microphone 26. The operation of the MS is controlled by a microprocessor 22, which processes the signalling transmitted and received by the receiver-transmitter 21. The user interface consists of a display 28 and a keyboard 29, which are connected to the microprocessor 22. To the microprocessor 22 is also connected a first timer 30, which measures the time spent by the MS in the same cell or in the same location area. The microprocessor 22 starts this timer 30 when entering a new cell or a new location area, and the timer 30 indicates to the microprocessor 22 when the timer 30 reaches a predetermined threshold value. Further, to the microprocessor 22 is connected a counter 31, which counts the number of cell, location area and location area level changes during a certain measuring period. The length of this measuring period is determined by another timer 32. At the beginning of the measuring period, the microprocessor 22 resets the counter 31 and the timer 32, whereupon the timer 32 starts to measure a respective measuring period. The microprocessor 22 increases the reading on the counter 31 every time the MS changes cell, location area or location area level. When the timer 32 reaches the end of the respective measuring period, it stops the counter 31 and informs the microprocessor 22 that the respective measuring period has ended. As a result of this, the microprocessor 22 reads the reading on the counter 31 and decides in the manner described above whether the location area level is to be changed. In the exemplifying solution illustrated in FIG. 2, the timers 30 and 32 and the counter 31 are illustrated as separate units. In practice, they can, however, be implemented by means of software also with internal counters and timers of the microprocessor 22.

The figures and the description relating to them are only intended to illustrate the present invention. In their details, the cellular radio network, the terminal equipment and the location updating method of the present invention can vary within the scope and spirit of the appended claims.

I claim:

1. A cellular radio network organized at least in part into a plurality of cells each belonging to a respective cell layer, comprising:

for each said cell a respective base station which broadcasts one or more location area identifiers or identifiers adapted to be used as such;

mobile subscriber equipment capable of moving so that the location data of the mobile subscriber equipment is stored with an accuracy of a location area consisting of one or more cells, of a cell layer, in the cellular radio network;

at least part of the cellular radio network being organized into at least two hierarchically arranged location area levels, with location areas, for each cell layer, the sizes of location areas being different at different ones of said location area levels;

each base station being arranged to broadcast identifiers of the respective location areas of all the respective location area levels in said cell layer which the respective cell belongs to and the respective base station serves.

2. The cellular radio network according to claim 1, wherein:

said mobile subscriber equipment has a fixed or a default-value based allocation to a certain location area level in said cell layer.

3. The cellular radio network according to claim 1, wherein:

said mobile subscriber equipment is arranged to dynamically select the location area level in said cell layer, that said mobile subscriber equipment will use.

4. Subscriber equipment for use in a cellular radio network organized at least in part into a plurality of cells each belonging to a respective cell layer, in which each cell being served by a respective base station which broadcasts one or more location area identifiers or identifiers adapted to be used as such, and in which mobile subscriber equipment instances, including said mobile subscriber equipment, is capable of moving so that the location data of the mobile subscriber equipment is stored with an accuracy of a location area consisting of one or more cells, of a cell layer, in the cellular radio network, comprising:

means for receiving location area information from a cell, this location area information including the location area identifiers of those location areas of at least two hierarchically arranged location area levels which the cell belongs to;

means for selecting the location area level to be applied to said subscriber equipment, and means for carrying out a location updating when said subscriber equipment moves from one location area into another at the respective location area selected by said means for selecting.

5. The subscriber equipment according to claim 4, wherein:

said means for selecting are arranged to select a certain location area level fixedly or on a default-value basis.

6. The subscriber equipment according to claim 4, wherein:

said means for selecting comprise means for measuring the duration of the period that the subscriber equipment has been loaded in a same cell, or in a same location area, and for activating said means for selecting, to carry out a location updating to another said location area level having a smaller location area size, in response to reaching a threshold duration.

7. The subscriber equipment according to claim 4 or 6, wherein:

said means for selecting comprise means for monitoring changes of location area, changes of cell and/or changes of location area level performed by said means for carrying out, and for preventing the subscriber equipment from changing from one, to another said location area level having a smaller location area size, if the number of respective said changes within a monitoring period exceeds a respective threshold value.

8. A method for carrying out a location updating in a cellular radio system, comprising the steps of:

storing the location data of a mobile subscriber equipment with an accuracy of a location area consisting of one or more cells of a respective cell layer;

broadcasting within each of said cells a respective one or more location area identifiers or identifiers adapted to be used as such;

carrying out a location updating by updating the respective said location data of the subscriber equipment when the subscriber equipment moves into a respective said cell which broadcasts a location area identifier not belonging to the location area determined by the location data currently stored in the subscriber equipment;

said storing, broadcasting and carrying out including using at least two hierarchically arranged location area levels for each of a plurality of cells of a single cell layer, the sizes of location areas being different among respective ones of said location area levels, in at least part of the cellular network;

transmitting to the mobile subscriber equipment the identifiers of those location areas of all the location area levels equating to the cell of which the mobile subscriber equipment currently belongs;

selecting a location area level to be a current location area level for the mobile subscriber equipment; and carrying out location updating of the mobile station, when the subscriber equipment moves from a location area into another at said current location area level as sensed by the mobile subscriber equipment as a result of said transmitting.

9. The method according to claim 8, further comprising:

measuring duration of the period the subscriber equipment has spend in a same cell or in a same location area;

selecting another location area level having a smaller location area size, in response to said duration reaching a threshold value; and carrying out said location updating at said other selected location area level.

10. The method according to claim 8 or 9, further comprising:

monitoring changes of location area, changes of cell and/or changes of location area level performed by the subscriber equipment within a monitoring period;

comparing the number of respective of said changes with a threshold value; and selecting another location area level, having a smaller location area size than that of said current location level if the number of respective of said changes within said monitoring period falls below said threshold value, but staying at said current location area level if the number of respective of said changes within said monitoring period exceeds said threshold value.

11. The method according to claim 8 or 9, further comprising:

monitoring changes of location area, changes of cell and/or changes of location area level performed by the subscriber equipment within a monitoring period;

comparing the number of respective of said changes with a threshold value;

selecting another location area level having a larger location area size than that of said current location level if the number of respective of said changes within said monitoring period exceeds said threshold value, but staying at said current location area level if the number of respective of said changes within said monitoring period falls below said threshold value.

12. The method according to claim 8 or 9, further comprising:

monitoring changes of location area, changes of cell and/or changes of location area level performed by the subscriber equipment within a monitoring period;

comparing the number of respective of said changes with a first and a second threshold value, said second threshold value being higher than said first threshold value;

selecting another location area level having a larger location area size than that of said current location area level if the number of respective of said changes within said monitoring period exceeds said second threshold value, but selecting another location area level having smaller location area size than that of said current location are level if the number of respective of said changes within said monitoring period falls below said first threshold value, and staying at said current location area level if the number of respective of said changes within said monitoring period is between said first and said second threshold values.

* * * * *